(12) United States Patent
Brainard

(10) Patent No.: US 12,036,773 B2
(45) Date of Patent: Jul. 16, 2024

(54) LAMINATE AND METHOD FOR MAKING THE SAME

(71) Applicant: INDUSTRIAL LAMINATES/NORPLEX, INC., Postville, IA (US)

(72) Inventor: Kevin L. Brainard, Monona, IA (US)

(73) Assignee: INDUSTRIAL LAMINATES/NORPLEX, INC., Postville, IA (US)

( * ) Notice: Subject to any disclaimer, the term of this patent is extended or adjusted under 35 U.S.C. 154(b) by 0 days.

(21) Appl. No.: 17/506,893

(22) Filed: Oct. 21, 2021

(65) Prior Publication Data

US 2022/0040960 A1 Feb. 10, 2022

Related U.S. Application Data

(63) Continuation-in-part of application No. 16/848,006, filed on Apr. 14, 2020, now abandoned.

(Continued)

(51) Int. Cl.

| | |
|---|---|
| *B32B 37/06* | (2006.01) |
| *B29C 65/00* | (2006.01) |
| *B32B 5/02* | (2006.01) |
| *B32B 7/023* | (2019.01) |
| *B32B 7/12* | (2006.01) |
| *B32B 25/08* | (2006.01) |
| *B32B 25/10* | (2006.01) |

(Continued)

(52) U.S. Cl.
CPC ............. *B32B 25/10* (2013.01); *B29C 66/71* (2013.01); *B29C 66/7212* (2013.01); *B32B 5/02* (2013.01); *B32B 7/023* (2019.01); *B32B 7/12* (2013.01); *B32B 25/08* (2013.01); *B32B 37/06* (2013.01); *B32B 37/10* (2013.01); *B32B 37/1045* (2013.01); *B32B 37/18* (2013.01); *B32B 2260/023* (2013.01); *B32B 2260/046* (2013.01); *B32B 2305/076* (2013.01); *B32B 2309/025* (2013.01); *B32B 2317/22* (2013.01); *B32B 2319/00* (2013.01); *C08J 5/244* (2021.05)

(58) Field of Classification Search
None
See application file for complete search history.

(56) References Cited

U.S. PATENT DOCUMENTS

| | | | | | |
|---|---|---|---|---|---|
| 4,412,687 | A | * | 11/1983 | Andre | ............ A63C 5/126 |
| | | | | | 280/610 |
| 2007/0149079 | A1 | * | 6/2007 | Vito | ............ A63B 71/141 |
| | | | | | 442/181 |

(Continued)

FOREIGN PATENT DOCUMENTS

| | | |
|---|---|---|
| EP | 1893405 B1 | 11/2011 |
| WO | 2006122749 A1 | 11/2006 |

OTHER PUBLICATIONS

Office Action (Non-Final Rejection) dated Nov. 7, 2022 for U.S. Appl. No. 16/848,006 (pp. 1-12).

(Continued)

*Primary Examiner* — Christopher T Schatz

(74) *Attorney, Agent, or Firm* — Barnes & Thornburg LLP

(57) ABSTRACT

A laminate blank includes at least one rigidifying layer and at least one comfort layer. The rigidifying layer includes a reinforcement preform and a resin. The layers are pressed to form the laminate blank.

18 Claims, 9 Drawing Sheets

Related U.S. Application Data

(60) Provisional application No. 62/834,552, filed on Apr. 16, 2019.

(51) Int. Cl.
    *B32B 37/10*     (2006.01)
    *B32B 37/18*     (2006.01)
    *C08J 5/24*     (2006.01)

(56) References Cited

U.S. PATENT DOCUMENTS

| | | | |
|---|---|---|---|
| 2012/0125534 A1* | 5/2012 | Watson | B29C 66/1122 |
| | | | 156/583.1 |
| 2018/0043637 A1* | 2/2018 | Jones | B32B 5/22 |
| 2019/0082770 A1* | 3/2019 | Takabu | A43B 11/00 |

OTHER PUBLICATIONS

Machine translation of EP 1893405 B1, obtained from EspaceNet (Year: 2022).
Office Action (Final Rejection) dated Mar. 17, 2022 for U.S. Appl. No. 16/848,006 (pp. 1-14).

* cited by examiner

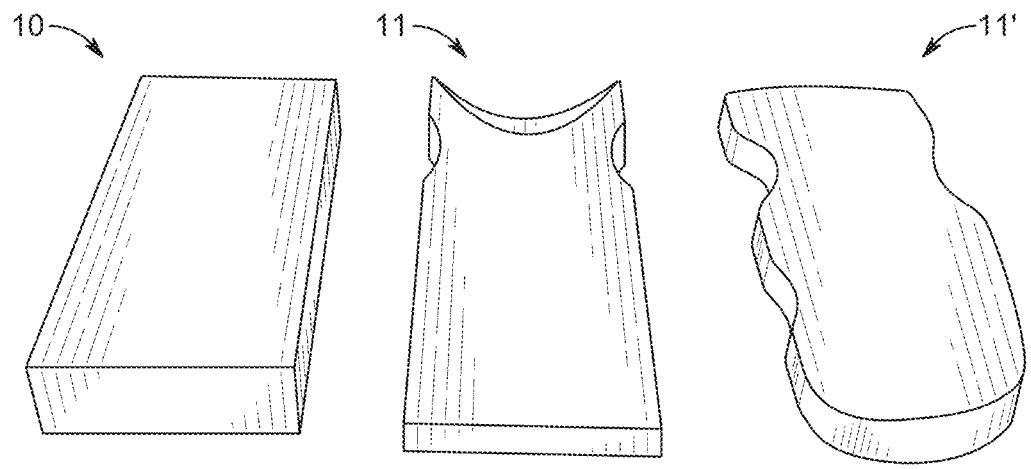
*FIG. 1*  *FIG. 1A*  *FIG. 1B*
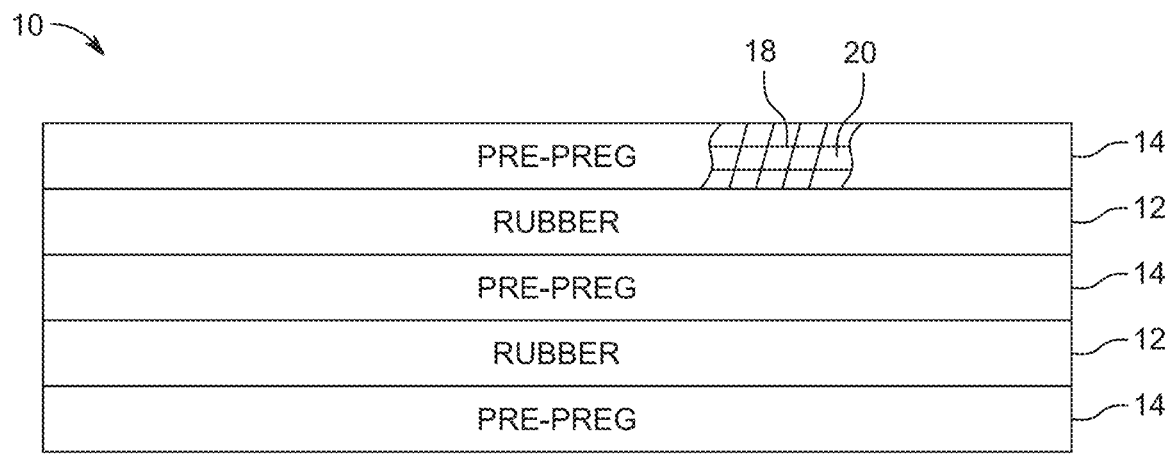
*FIG. 2*

LAMINATE AND METHOD FOR MAKING THE SAME

PRIORITY CLAIM

This application is a continuation-in-part of U.S. patent application Ser. No. 16/848,006, filed Apr. 14, 2020, which claims the benefit, under 35 U.S.C. § 119(e), to U.S. Provisional Application No. 62/834,552, filed Apr. 16, 2019, the contents of each of which is incorporated by reference in their entirety into the present application.

BACKGROUND

The present disclosure relates to blanks, and particularly to blanks used to manufacture other components. More particularly, the present disclosure relates to a laminate blank.

BRIEF DESCRIPTIONS OF THE DRAWINGS

The detailed description particularly refers to the accompanying figures in which:

FIG. 1 is a perspective view of a laminate blank that can be used to manufacture other components such as a grip as shown in FIGS. 1A and 1B;

FIG. 1A is a perspective view of a grip manufactured from the laminate blank in FIG. 1;

FIG. 1B is a perspective view of another grip manufactured from the laminate blank in FIG. 1;

FIG. 2 is a sectional view taken along line 2-2 of FIG. 1, showing that the molded blank includes a plurality of prepreg layers interlaid between a plurality of rubber layers;

Figure 3:
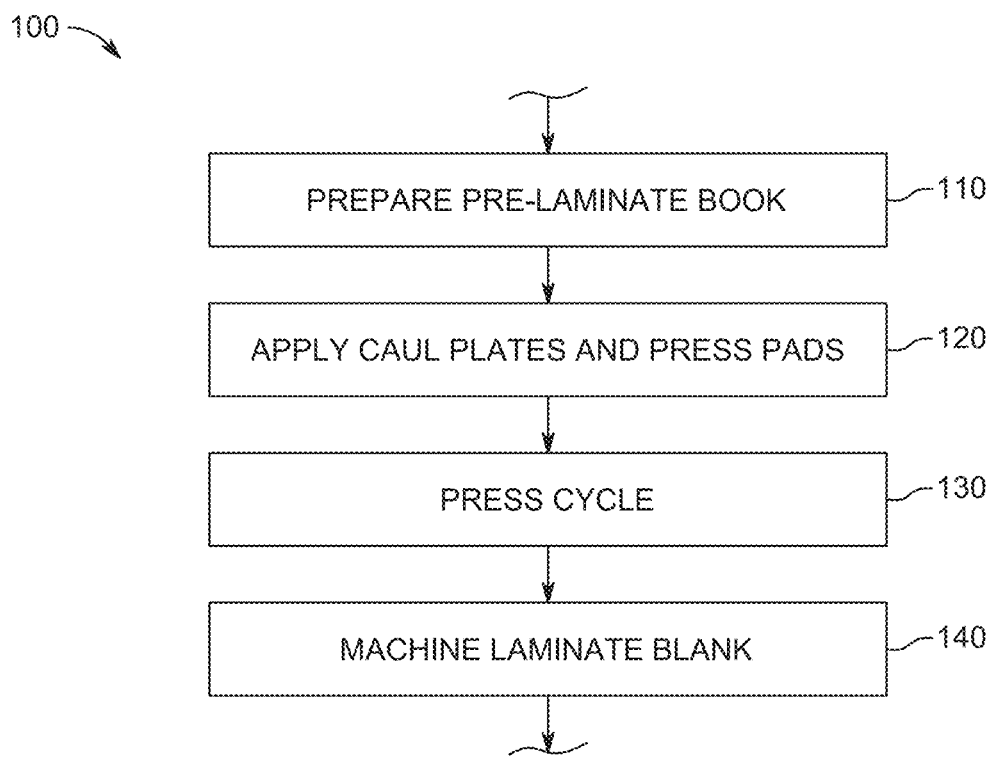
Figure 4A:
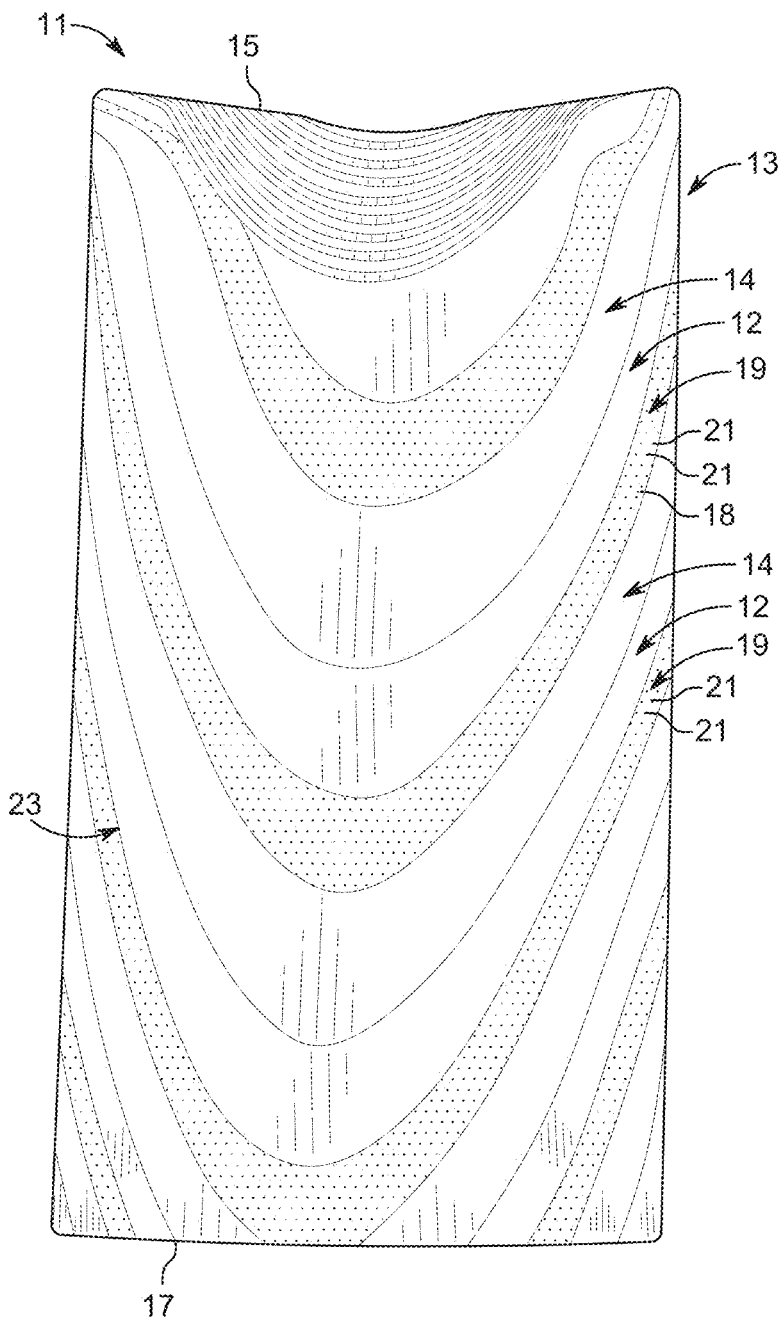
Figure 4B:
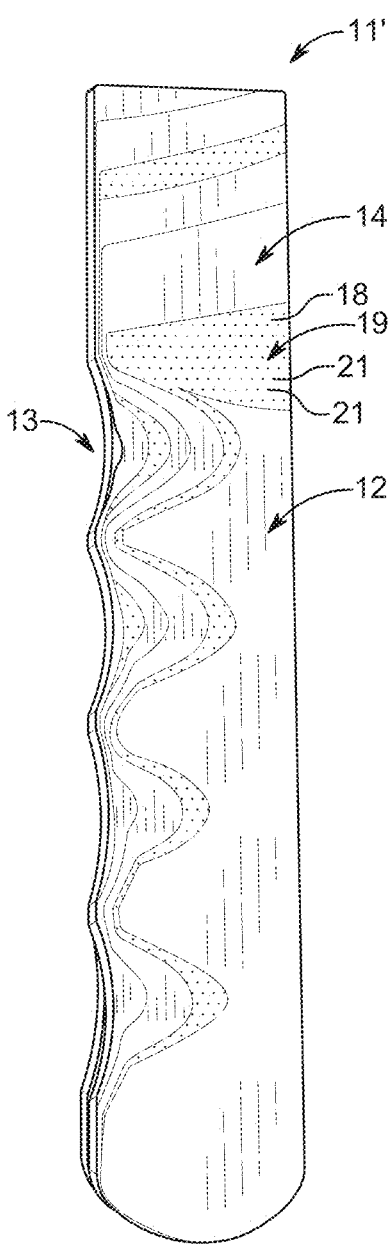
Figure 5:
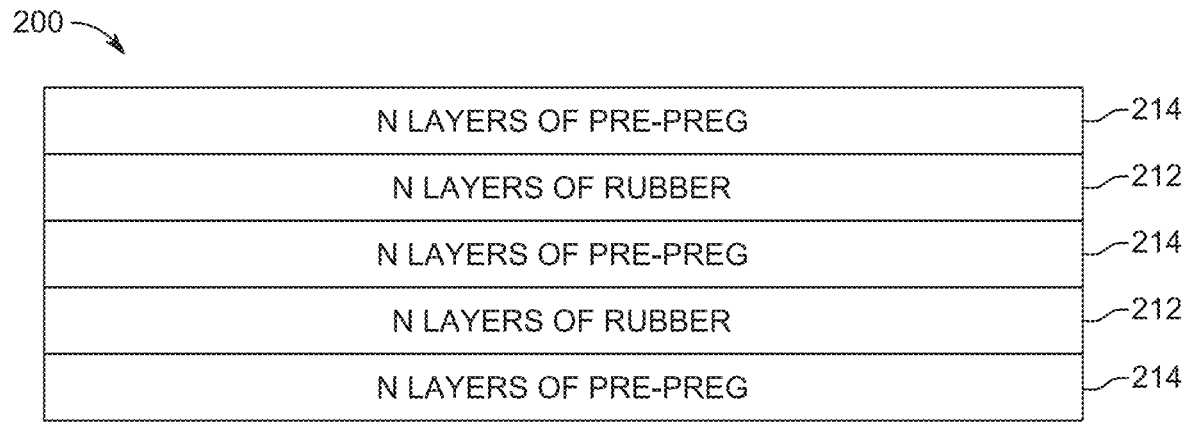
Figure 6:
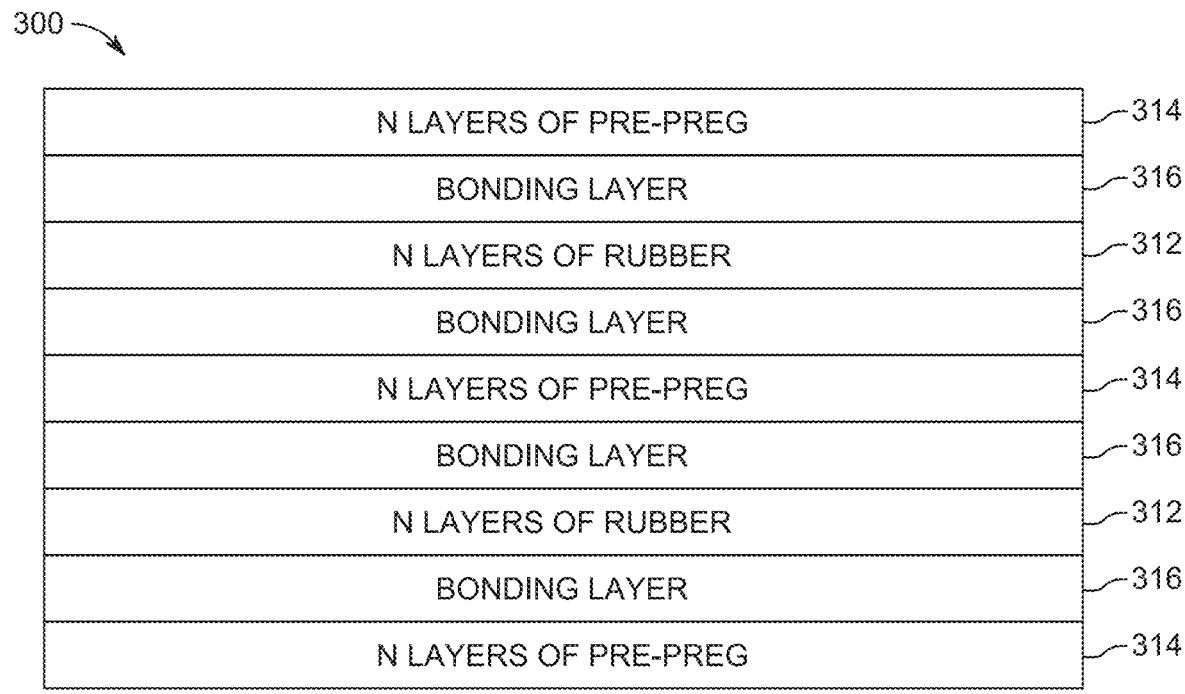
Figure 7:
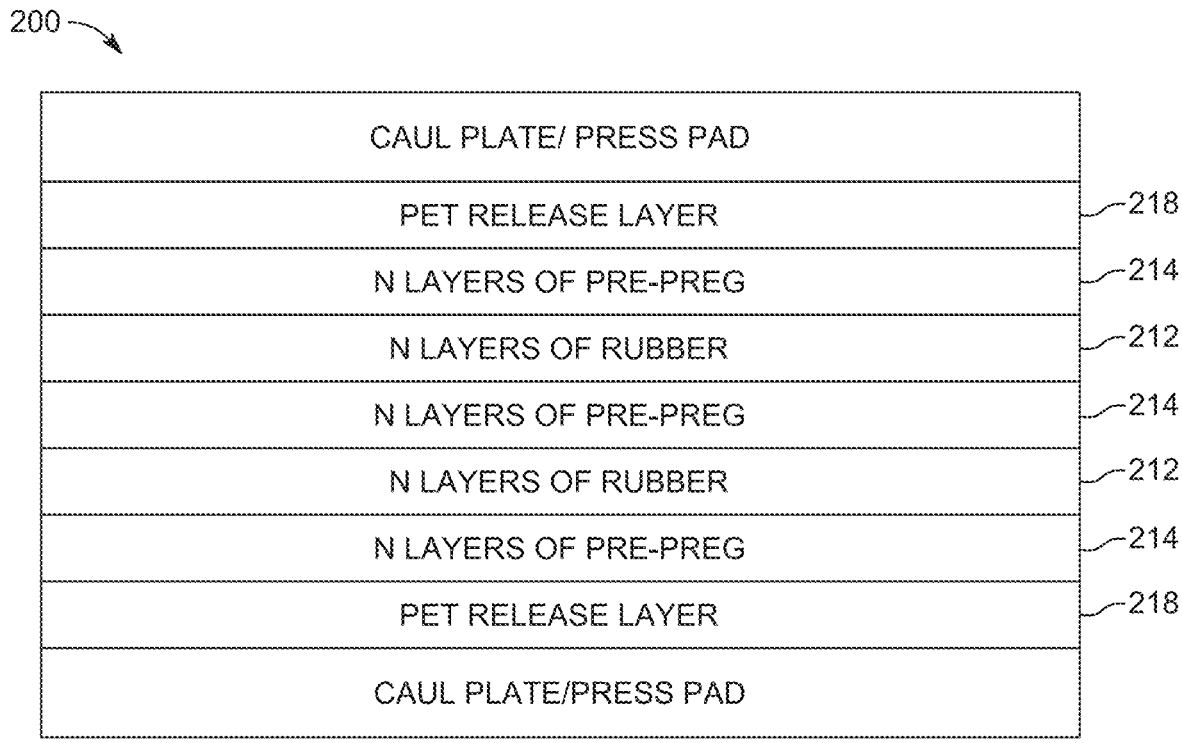
Figure 8:
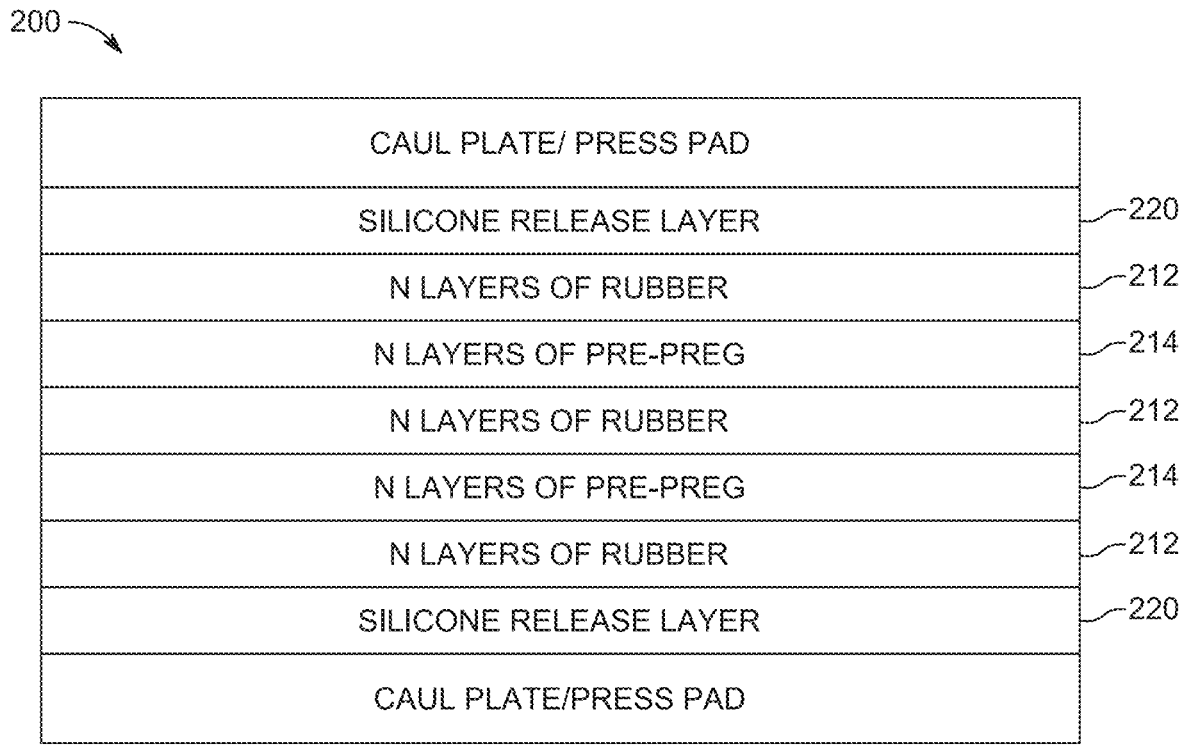
Figure 9:
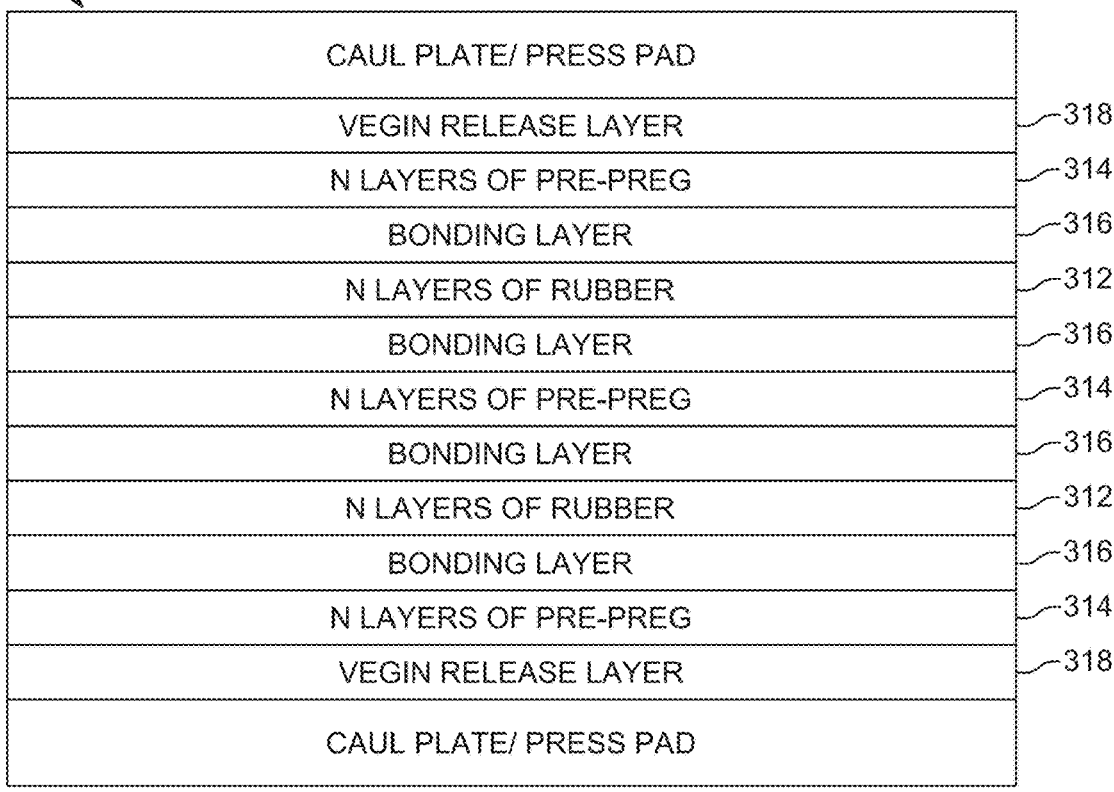
Figure 10:
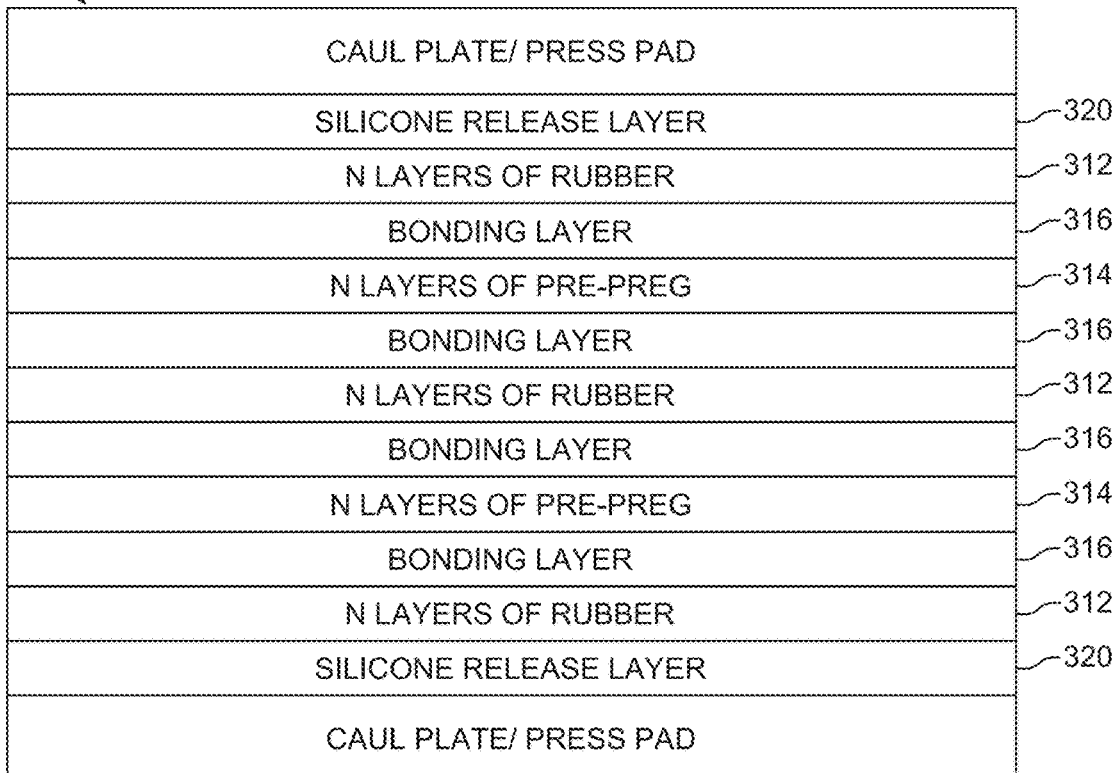
Figure 11:
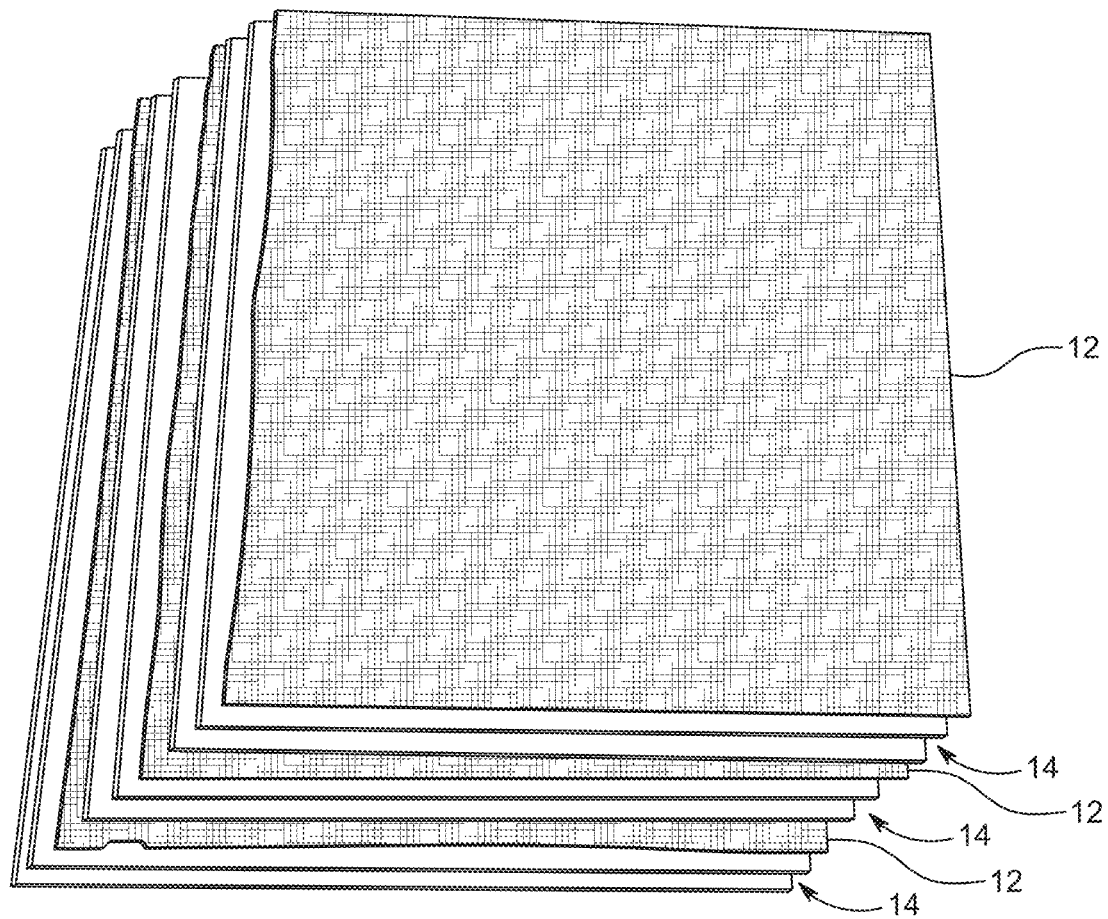
Figure 12:
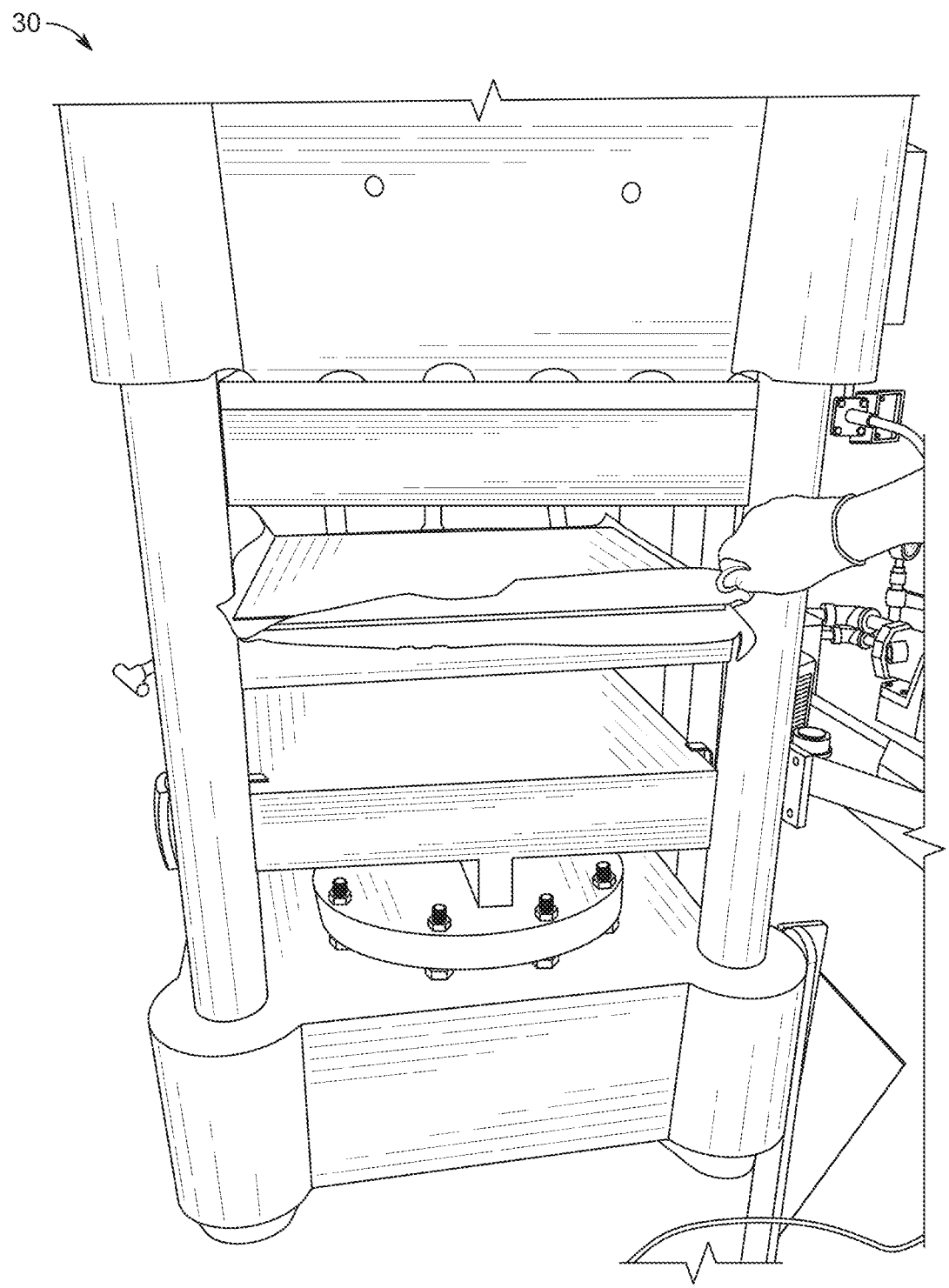
Figure 13:
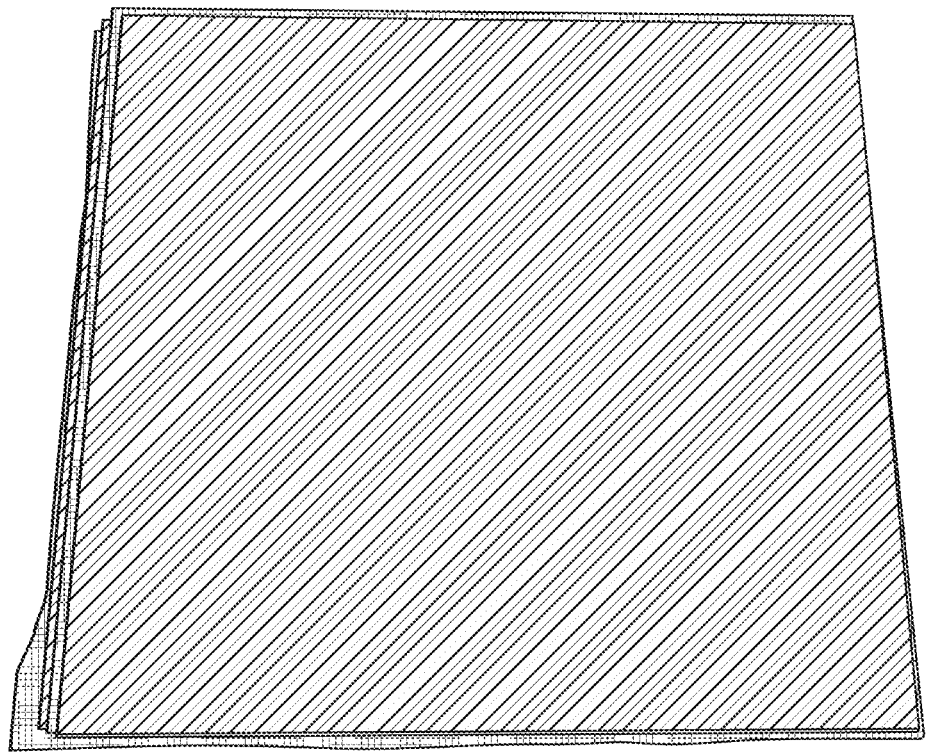
Figure 14:
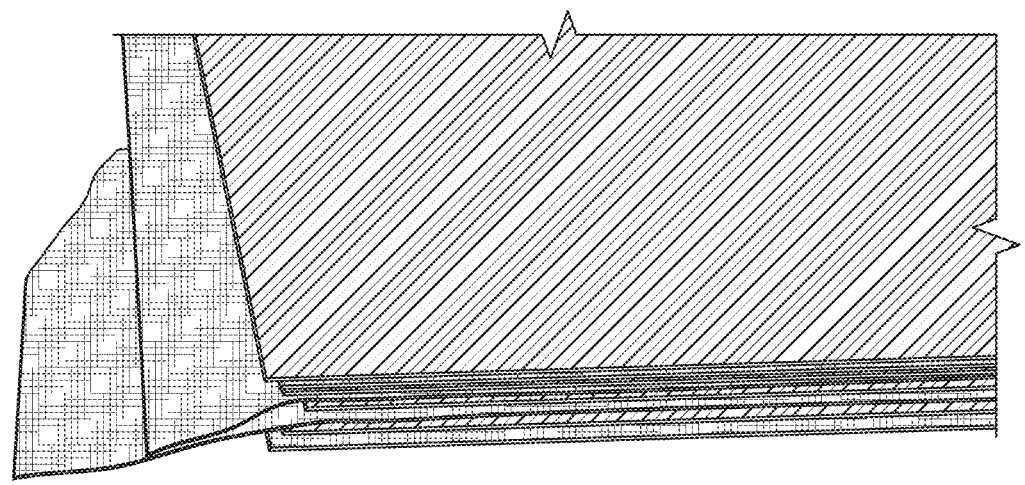

FIG. 3 is a diagrammatic dead-section view of a method of manufacturing a laminate blank, showing from top to bottom, a step preparing a pre-laminate book by stacking layers of prepreg and rubber, a step of applying caul plates and press pads and positioning the pre-laminate book with the caul plates and press pads on a pressing machine, a step of pressing the pre-laminate book and processing the pre-laminate book in the press machine through a press cycle to form the laminate blank, and a step of manufacturing a grip from the laminate blank;

FIGS. 4A and 4B are perspective views of other types of grips manufactured from the laminate blank in accordance with the present disclosure;

FIG. 5 is a sectional and diagrammatic view similar to FIG. 2, of a first embodiment of a pre-laminate book in accordance with the present disclosure;

FIG. 6 is a sectional and diagrammatic view similar to FIGS. 2 and 5, showing another embodiment of a pre-laminate book in accordance with the present disclosure and showing a bonding layer included between each layer of prepreg and rubber;

FIG. 7 is a sectional and diagrammatic view of the first embodiment of the pre-laminate book with caul plates and press pads applied and a PET release layer located between pre-laminate book and the caul plates and press pads;

FIG. 8 is a sectional and diagrammatic view of a third embodiment of a pre-laminate book with caul plates and press pads applied and a silicone release layer located between the pre-laminate book and the caul plates and press pads;

FIG. 9 is sectional and diagrammatic view of a fourth embodiment of a pre-laminate book with caul plates and press pads applied and a vegin release layer located between the pre-laminate book and the caul plates and press pads;

FIG. 10 is sectional and diagrammatic view of a fifth embodiment of a pre-laminate book with caul plates and press pads applied and a silicone release layer located between the pre-laminate book and the caul plates and press pads;

FIG. 11 is a perspective view of a pre-laminate book with a plurality of prepreg layers and rubber layer misaligned with one another to show how different numbers of prepreg and rubber may be used together to form a pre-laminate book with user desired structure, color, and thickness;

FIG. 12 is a perspective view of a pre-laminate book being placed in a pressing machine that is configured to process the pre-laminate book through a press cycle to produce a laminate blank;

FIG. 13 is a perspective view of a finished laminate blank after being processed through the press cycle; and FIG. 14 is an enlarged perspective view of a portion of the finished laminate blank in FIG. 13 showing the different layers of prepreg and rubber that make up the laminate.

DETAILED DESCRIPTION

A laminate blank 10, in accordance with the present disclosure, for use in manufacturing other components, such as, for example, grips 11, 11', is shown in FIGS. 1-1B. The laminate blank 10 may be worked to form a grip 11, 11' for handheld devices as shown in FIGS. 1A, 1B, 4A, and 4B, such as, for example, a knife, handgun, bow, or another device held by hand. A method for forming the laminate blank 10 is shown in FIG. 3. Additional embodiments of molded blanks 210, 310, 410, and 510 are shown in FIGS. 5-10. In some embodiments, any of laminate blank 10, 210, 410, 510, grips 11, and grip 11' may be referred to as an article.

The laminate blank 10 illustratively includes a plurality of ergonomic-comfort layers 12 (also called rubber layers 12) interlaid between a plurality of rigidifying-support layers 14 (also called prepreg layers 14) that are stacked to provide a block as shown in FIG. 2. In other embodiments, the rubber 12 and the prepreg 14 may be joined to one another to produce another suitable structure such as, for example, a plate, a rod, or a tube. The rubber layers 12 are relatively flexible and have a greater coefficient of friction than the prepreg layers 14. The prepreg layers 14 rigidify the laminate blank 10 so that the laminate blank 10 may be manufactured in to a grip and used in applications where the laminate is subjected to forces during use. Depending on the type of prepreg 14 used, the laminate blank 10 may optionally include a bonding layer 16 to increase bonding between the rubber layers 12 and the prepreg layers 14.

The laminate blank 10 may be customized to user preferences for aesthetics and comfort. For example, the laminate 10 may have any desired color and/or patterns of colors provided by the rubber 12 and prepreg layers 14. Additionally, the laminate blank 10 may have any suitable thickness to fit the hand of any given user by adding or removing layers of rubber 12 and prepreg 14 until a desired overall thickness of the laminate blank 10 is reached. The laminate blank 10 may include any number of rubber layers 12 and prepreg layers 14 to change the stiffness of the laminate blank 10. Generally, an increased number of rubber layers 12 coincides with a lower stiffness while an increased number of prepreg layers 14 coincides with a higher stiffness.

In one example, the rubber layers 12 includes a 0.041-inch thick Tan Buna 68 Duro ply that is about 40.5 inches long by about 80.5 inches wide. In another example, the rubber layers 12 include a 0.040-inch thick Tan Buna 65

Duro ply that is about 40.5 inches long by about 80.5 inches wide. In another example, the rubber layers 12 include a 0.015-inch thick Red Buna N ply that is about 40 inches long by about 80 inches wide. In another example, the rubber layers 12 include a 0.031-inch thick Red Buna N ply that is about 40 inches long by about 80 inches wide. In another example, the rubber layers 12 include a 0.020-inch thick Red Buna N ply that is about 40.5 inches long by about 80.5 inches wide. In another example, the rubber layers 12 include a 0.046-inch thick Red Buna N ply that is about 40.5 inches long by about 80.5 inches wide. In another example, the rubber layers 12 include a 0.015-inch thick Black Buna N ply that is about 50.5 inches long by about 124.5 inches wide. In another example, the rubber layers 12 include a 0.015-inch thick Black Buna N ply that is about 40.5 inches long by about 80.5 inches wide. In another example, the rubber layers 12 include a 0.015-inch thick Red Buna N ply that is about 40.5 inches long by about 80.5 inches wide. In another example, the rubber layers 12 include a 0.025-inch thick Red Buna N ply that is about 40.5 inches long by about 80.5 inches wide. In another example, the rubber layers 12 include a 0.031-inch thick Red Buna N ply that is about 40.5 inches long by about 80.5 inches wide. In another example, the rubber layers 12 include a 0.062-inch thick Red Buna N ply that is about 40.5 inches long by about 80.5 inches wide. In another example, the rubber layers 12 include a 0.032-inch thick Tan Buna N ply that is about 40.5 inches long by about 80.5 inches wide. In another example, the rubber layers 12 include a 0.031-inch thick Black Buna ply that is about 40.5 inches long by about 80.5 inches wide. In another example, the rubber layers 12 include a 0.036-inch thick Black Buna ply that is about 50 inches long by about 40 inches wide. In another example, the rubber layers 12 may have other colors.

In other examples, the rubber layers 12 may include Neoprene, Buna-N (also called nitrile, acrylonitrile, and NBR), Silicone (also called polysiloxane), EPDM, Natural Gum, Viton (also called FKM), Natural Latex, SBR (also called styrene butadiene), Vinyl (also called polyvinyl chloride), Santoprene, epichlorohydrin (ECH), Butyl (also called isobutylene isoprene), Latex-Free TPE, and/or Hypalon (also called chlorosulfonated polyethylene). In other examples, the rubber layers 12 may include combinations of the plies and materials described above.

The prepreg layers 14 include a reinforcement preform 18 and a resin 20 meshed with the reinforcement preform 18 as shown in FIG. 2. The reinforcement preform 18 includes composite fibers that are woven or braided together and then preimpregnated with the resin 20 to provide a reinforced thermoset plastics layer (i.e. prepreg 14). In some embodiments, the reinforcement preform 18 includes at least one of fiberglass (i.e. G10), canvas, linen, paper, or combinations thereof. In some embodiments, the resin 20 includes at least one of an epoxy, phenolic, melamine, or a combination thereof.

In one example, each of the rubber layers 12 is free from reinforcements such as fiberglass (i.e. G10), canvas, linen, paper, or combinations thereof. In some embodiments, each of the rubber layers 12 is substantially free from reinforcements such as fiberglass (i.e. G10), canvas, linen, paper, or combinations thereof. Each of the rubber layers 12 is also free from resin such as epoxy, phenolic, melamine. In some embodiments, each of the rubber layers consists of a rubber material such as one of the materials noted above or combinations thereof. In some embodiments, each of the rubber layers consists essentially of a rubber material such as one of the materials noted above or combinations thereof.

In one example, each of the prepreg layers 14 is free from rubber. In another example, each of the prepreg layers 14 is substantially free from rubber. Each of the prepreg layers 14 has a stiffness that is greater than each of the rubber layers 12 to provide support for a component (i.e. grips 11, 11') made by the laminate blank 10. Each of the rubber layers 12 is deformable and/or compressible relative to each of the prepreg layers 14. In one example, the fibers 18 of each prepreg layer 14 are not Kevlar® or aramid. In one example, the fibers 18 are free of or substantially free of Kevlar® or aramid.

The laminate blank 10 shown in FIG. 2 includes two prepreg layers 14 that form outermost layers of the blank and at least one interior prepreg layer 14 located between two rubber layers 12. Accordingly, the laminate blank 10 includes at least an integer value of rubber layers 12 and one more prepreg layer 14 greater than the interger value of rubber layers 12 once fully formed. Such an arrangement of rubber layers 12 and prepreg layers 14 provides cushioning from each of the rubber layers 12 and reinforcement from each of the prepreg layers 14 when the laminate blank 10 is used to form a gripable component such as handgrips 11, 11'. Such an arrangement unexpectedly allowed each of the prepreg layers to bond together and form the laminate blank 10 during a process 100 explained below without including any bonding layers or adhesives between the prepreg layers 14 and the rubber layers 12, in some embodiments. The laminate blank 10 also unexpectedly remained bonded between each layer 12, 14 during and after forming the laminate blank 10 into a component such as handgrips 11, 11'.

In one example, the laminate blank 10 (and the handgrips 11, 11' formed from the laminate blank 10) include transition layers 19 between the rubber layers 14 and each neighboring prepreg layer 12. Within the transition layers 19, portions of the rubber layers 14 extend into voids formed between the fibers 18 of the prepreg layers 12 to provide nodes 21 of rubber. The nodes 21 may contribute to bonding the rubber layers 12 to the prepreg layers 14. In one example, the transition layers are formed by method 100.

In another example, the laminate blank 10 (and the handgrips 11, 11' formed from the laminate blank 10) include transition areas 19 between the rubber layers 14 and each neighboring prepreg layer 12. Within the transition areas 19, portions of the rubber layers 14 extend into voids formed between the fibers 18 of the prepreg layers 12 to provide nodes 21 of rubber. The nodes 21 may contribute to bonding the rubber layers 12 to the prepreg layers 14. In one example, the transition areas are formed by method 100.

In one embodiment, the prepreg layers 14 include one of the following grades: SE4GW02, SP1NW01, or SP2NW02 available from Norplex-Micarta located in Postville, IA. In another embodiment, combinations of prepreg layers 14 with the grades listed above may be used.

Some types of reinforcement preforms 18 may use a bonding layer 16 between each rubber/prepreg interface to increase bonding between the prepreg layers 14 and the rubber layers 12. In the illustrative embodiment, a suitable bonding layer 16 is item number 405544 manufactured by Norplex-Micarta located in Postville, IA.

An illustrative method 100 of forming a box-shaped laminate blank 10 described above is shown in FIG. 3. The method begins with a step 110 where a user prepares a pre-laminate book that is later formed into the laminate blank 10 through a press cycle 130 as will be described. Preparing the pre-laminate book includes selecting a color or pattern of colors. In the illustrative embodiment, the rubber layers 12 and the preform layers 14 may include any desired color or pattern of colors. For example, the rubber layers 12 may include a black color while the prepreg layers 14 include a yellow color to provide a stripped pattern with alternating layers of black rubber 12 and yellow prepreg 14. In other embodiments, the laminate blank 10 may include multiple layers of rubber 12 or prepreg 14 with different colors.

The step 110 of preparing the pre-laminate book continues with the user selecting a desired thickness for the laminate blank 10. As described above, the thickness is a function of the number of layers of both rubber 12 and prepreg 14 and can be altered by adding or removing layers. Alternatively, the rubber layers 12 and/or the prepreg layers 14 may be preselected based on the relative thickness of each individual layer and combined to reach a desired overall thickness. The step 110 may further include applying a bonding layer 16 between each interface between a rubber layer and a prepreg layer 14 depending on the type of prepreg layer used.

The method continues with a step 120 of applying caul plates, press pads and/or release layers (see FIGS. 7-10) over the pre-laminate book prior to the pre-laminate book being readied for the press cycle 130. The caul plates include a metallic material that is placed over the last layer on each side of the pre-laminate book to protect the caul plates during the press cycle 130. The press pads include non-metallic material and are placed over an outer surface of each caul plate relative to the pre-laminate book. The pre-laminate book, along with the caul plates and the press pads, is the placed in a pressing machine 30 (See FIG. 12) and readied for the press cycle 130. The pressing machine is illustratively a hot press machine that is able to apply at least 450 psi on the pre-laminate book and provide heating and cooling within a range of about 50 degrees Fahrenheit (F) to about 350 degrees F.

The press cycle 130 includes a series of heating steps and cooling steps to form the laminate blank 10 as shown in FIG. 4. The press cycle 130 begins with pre-heating the pressing machine to a temperature within a range of about 225 degrees F. to about 275 degrees F. The pre-laminate book is then placed in the pressing machine with the caul plates, press pads and/or release layers for pressing. More than one pre-laminate book may be pressed at a time depending on the size of the pressing machine and the size of the pre-laminate book being pressed. In the illustrative embodiment, the pressing machine is configured to apply a pressure within a range of about 325 psi to about 475 psi throughout the press cycle 130. In the illustrative embodiment, the pressure remains constant; however in other embodiments the pressure may vary during the press cycle 130.

The press cycle 130 continues with pressing the pre-laminate book at a temperature within a range of about 225 degrees F. to about 275 degrees F. for an amount of time within a range of about 10 minutes to about 20 minutes. The pre-laminate book is then pressed at a temperature within a range of about 300 degrees F. to about 325 degrees F. for an amount of time within a range of about 40 minutes to about 50 minutes. The pre-laminate is then pressed at a temperature within a range of about 275 degrees F. to about 300 degrees F. for an amount of time within a range of about 10 minutes to about 15 minutes. The pre-laminate book is then pressed at a temperature of less than about 100 degrees F. for an amount of time within a range of about 20 minutes to about 30 minutes. Once these steps are completed, the pre-laminate book is now the laminate blank 10 and the laminate blank 10 may then be machined at a step 140 to form various items such as grips 11, 11' as shown in FIGS. 4A and 4B.

The illustrative handgrips 11, 11' shown in FIGS. 4A and 4B were formed from a laminate blank 10 including the plurality of prepreg layers 12 and the plurality of the rubber layers 14 that have been fully processed through method 100. The handgrips 11, 11' are each formed to include contours 13 that coincide with a hand of a user to provide an ergonomic handgrip. The contours 13 are defined by both prepreg layers 12 and rubber layers 14 which overlap one another and have varying lengths between an upper edge 15 and an a lower edge 17 of the handgrips 11, 11'. The prepreg layers 12 and the rubber layers 14 may also vary in width along their length so that each have a curvilinear shape or u-shape. The rubber layers 14 may combine with one or more of the prepreg layers 14 to provide transition layers 19 between the rubber layers 14 and the prepreg layers 12. Within the transition layers 19, portions of the rubber layers 14 extend into voids formed between the fibers 18 of the prepreg layers 12 to provide nodes 21 of rubber. The nodes 21 may be interlaid in the fibers 18 of the prepreg layers once fully processed to bond the rubber layers 14 with the prepreg layers 12 and provide the handgrip 11, 11'. The nodes 21 may protrude through the fibers 18 to partially define an outer surface 23 of the handgrip 11, 11'.

Some examples of pre-laminate books prior to being readied for the press cycle 130 are shown diagrammatically in FIGS. 5 and 6. A first embodiment of a pre-laminate book 200 is shown in FIG. 5. The pre-laminate book 200 includes alternating layers of rubber 212 and prepreg 214. The pre-laminate book 200 may include any number of layers rubber 212 and any number of layers of prepreg 214. In the illustrative embodiment, the rubber 212 is one of the types described above and the prepreg 214 includes a fiberglass reinforcement preform and an epoxy resin.

A second embodiments of a pre-laminate book 300 is shown in FIG. 6. The pre-laminate book 300 includes alternating layers of rubber 312, prepreg 314 and bonding layers 316. The pre-laminate book 300 may include any number of layers rubber 312 and any number of layers of prepreg 314. In the illustrative embodiment, the rubber 312 is one of the types described above and the prepreg 314 includes a canvas, linen, or paper reinforcement preform and a phenolic resin. At least one bonding layer 316 is positioned between each rubber/prepreg interface.

Some examples of pre-laminate books readied for the pressing cycle 130 are shown in FIGS. 7-10. The first embodiment of the pre-laminate book 200 is loaded with release layers 218, 220 on each end of the prepreg book 200 between the caul plates/press pads and the pre-laminate book 200 as shown in FIGS. 7 and 8. If the pre-laminate book has a prepreg outermost layer 214, a Polyethylene terephthalate (PET) release layer 218 is positioned between the prepreg book 200 and the caul plates/press pads as shown in FIG. 7. If the pre-laminate book 200 has a rubber outermost layer 212, a silicone release layer 220 is positioned between the prepreg book 200 and the caul plates/press pads as shown in FIG. 8.

The second embodiment of the pre-laminate book 300 is loaded with release layers 318, 320 on each end of the prepreg book 300 between the caul plates/press pads and the pre-laminate book 300 as shown in FIGS. 9 and 10. If the pre-laminate book 300 has a prepreg outermost layer 314 that includes a phenolic resin, a vegin release layer 318 is positioned between the prepreg book 200 and the caul plates/press pads as shown in FIG. 9. If the pre-laminate book 200 has a rubber outermost layer 212, a silicone release layer 220 is positioned between the prepreg book 200 and the caul plates/press pads as shown in FIG. 10.

The invention claimed is:

1. A method of forming an article, the method comprising
preparing a pre-laminate book including a plurality of prepreg layers and a plurality of rubber layers interlaid between the prepreg layers,
applying caul plates and press pads to outermost layers of the pre-laminate book, and
processing the pre-laminate book through a press cycle to form a laminate blank used to form the article,
wherein the processing includes pressing the pre-laminate book at a temperature within a range of about 225 degrees F. to about 275 degrees F. for an amount of time within a range of about 10 minutes to about 20 minutes, and
wherein the processing includes pressing the pre-laminate book at a temperature within a range of about 300 degrees F. to about 325 degrees F. for an amount of time within a range of about 40 minutes to about 50 minutes.

2. The method of claim 1, wherein the processing includes pressing the pre-laminate book at a temperature within a range of about 275 degrees F. to about 300 degrees F. for an amount of time within a range of about 10 minutes to about 15 minutes.

3. The method of claim 2, wherein the processing includes pressing the pre-laminate book at a temperature of less than about 100 degrees F. for an amount of time within a range of about 20 minutes to about 30 minutes.

4. The method of claim 1, wherein each of the plurality of prepreg layers includes a reinforcement preform and a resin and each of the plurality of rubber layers is interlaid between the plurality of prepreg layers, and wherein each of the prepreg layers is free from rubber and each of the rubber layers is free from reinforcement preform.

5. The method of claim 1, wherein the outermost layers include a first outer prepreg layer, a second outer prepreg layer, and wherein the plurality of prepreg layers further includes an inner prepreg layer, and the plurality of rubber layers includes a first rubber layer and a second rubber layer, and wherein preparing the pre-laminate book includes positioning the first and second outer prepreg layers to at least partially provide an outer surface of the article and positioning the inner prepreg layer between and spaced apart from the first and second outer prepreg layers such that the first rubber layer is positioned between and interconnects the first outer prepreg layer and the inner prepreg layer and the second rubber layer is positioned between and interconnects the second outer prepreg layer and the inner prepreg layer to locate the inner prepreg layer between the first and second rubber layers.

6. The method of claim 5, wherein the press cycle includes applying a pressure of at least 450 psi to the pre-laminate book.

7. The method of claim 6, wherein each of the rubber layers is pre-cured prior to the press cycle.

8. The method of claim 5, wherein the press cycle includes applying a pressure within a range of about 325 psi to about 475 psi to the pre-laminate book.

9. The method of claim 1, wherein each of the plurality of prepreg layers includes a reinforcement preform and a resin, and wherein each of the prepreg layers interfaces with at least one rubber layer included in the plurality of rubber layers to provide a transition layer therebetween, the transition layer including a plurality of nodes of rubber that extend into voids defined between the reinforcement fibers of each neighboring prepreg layer.

10. The method of claim 9, wherein, after the press cycle, at least some of the nodes protrude through fibers included in the reinforcement preform of at least one prepreg layer included in the plurality of prepreg layers to partially define an outer surface the article with the at least one prepreg layer.

11. The method of claim 10, further including machining the laminate blank into a handgrip including a plurality of contours to coincide with a user's hand, each of the contours being defined by one or more prepreg layers included in the plurality of prepreg layers and one or more rubber layers included in the plurality of rubber layers that overlap one another and have varying lengths or widths.

12. The method of claim 9, wherein each reinforcement preform of each of the plurality of prepreg layers includes fiberglass.

13. The method of claim 12, wherein the resin of the plurality of prepreg layers includes epoxy.

14. The method of claim 9, wherein each reinforcement preform of each of the plurality of prepreg layers includes at least one of fiberglass, canvas, linen, and paper.

15. The method of claim 14, wherein the resin of the plurality of prepreg layers includes at least one of epoxy and phenolic.

16. The method of claim 1, wherein preparing the pre-laminate book further includes placing a bonding layer at each interface between the prepreg layers and the rubber layers.

17. The method of claim 16, wherein the bonding layer includes phenolic.

18. The method of claim 1, wherein preparing the pre-laminate book includes selecting a first color for the plurality of prepreg layers and a second color different than the first color for the plurality of rubber layers.

* * * * *